US011919129B2

(12) United States Patent
Huber et al.

(10) Patent No.: US 11,919,129 B2
(45) Date of Patent: *Mar. 5, 2024

(54) ADAPTIVE IMPACT BLOW DETECTION

(71) Applicant: MILWAUKEE ELECTRIC TOOL CORPORATION, Brookfield, WI (US)

(72) Inventors: Alex Huber, Menomonee Falls, WI (US); Matthew Wycklendt, Madison, WI (US); Matthew Mergener, Mequon, WI (US); Cole Conrad, Wauwatosa, WI (US); Wing Fung Yip, Kowloon (HK)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,029

(22) Filed: Oct. 6, 2022

(65) Prior Publication Data

US 2023/0033932 A1 Feb. 2, 2023

Related U.S. Application Data

(63) Continuation of application No. 16/796,594, filed on Feb. 20, 2020, now Pat. No. 11,485,000, which is a (Continued)

(51) Int. Cl.

| | |
|---|---|
| ***B25B 23/147*** | (2006.01) |
| ***B25B 21/02*** | (2006.01) |
| ***B25B 23/18*** | (2006.01) |

(52) U.S. Cl.

CPC .......... *B25B 23/1475* (2013.01); *B25B 21/02* (2013.01); *B25B 23/18* (2013.01)

(58) Field of Classification Search

CPC ..... B25B 21/02; B25B 23/1475; B25B 23/18; B25B 23/14; B25B 21/026; B25B 23/1453

(Continued)

(56) References Cited

U.S. PATENT DOCUMENTS

| | | |
|---|---|---|
| 2,980,218 A | 4/1961 | Young |
| 3,739,659 A | 6/1973 | Workman, Jr. |

(Continued)

FOREIGN PATENT DOCUMENTS

| | | |
|---|---|---|
| DE | 10029132 A1 | 1/2002 |
| DE | 202006014606 U1 | 1/2007 |

(Continued)

*Primary Examiner* — Andrew M Tecco
*Assistant Examiner* — Nicholas E Igbokwe
(74) *Attorney, Agent, or Firm* — Michael Best & Friedrich LLP

(57) ABSTRACT

A power tool and method of detecting impacts of a power tool that includes a motor driving a hammer to impact an anvil. A motor control unit is configured to determine a motor characteristic indicative of a speed of the motor. When the motor characteristic indicates that the speed of the motor is below a speed threshold, the motor control unit employs an acceleration-based technique to detect a first impact based on a change in motor acceleration and generate a first impact indication in response to detecting the first impact. When the motor characteristic indicates that the speed is above the speed threshold, the motor control unit employs a time-based technique to detect a second impact based on an elapsed time and generates a second impact indication in response to detecting the second impact.

20 Claims, 10 Drawing Sheets

Related U.S. Application Data continuation of application No. 15/146,563, filed on May 4, 2016, now Pat. No. 10,603,770.

(60) Provisional application No. 62/156,864, filed on May 4, 2015.

(58) Field of Classification Search
USPC ........................ 173/93, 176, 217, 170, 5–11
See application file for complete search history.

(56) References Cited

U.S. PATENT DOCUMENTS 3,882,305 A 5/1975 Johnstone
3,965,778 A 6/1976 Aspers et al.
4,249,117 A 2/1981 Leukhardt et al.
4,545,106 A 10/1985 Juengel
4,680,862 A 7/1987 Wieland et al.
4,685,050 A 8/1987 Polzer et al.
4,854,786 A 8/1989 Alexander et al.
4,881,435 A 11/1989 Hansson
4,991,473 A 2/1991 Gotman
5,025,903 A 6/1991 Elligson
5,154,242 A 10/1992 Soshin et al.
5,203,242 A 4/1993 Hansson
5,277,261 A 1/1994 Sakoh
5,315,501 A 5/1994 Whitehouse
5,526,460 A 6/1996 DeFrancesco et al.
5,903,462 A 5/1999 Wagner et al.
5,942,975 A 8/1999 Sørensen
6,123,241 A 9/2000 Walter et al.
6,157,313 A 12/2000 Emmermann
6,161,629 A 12/2000 Hohmann et al.
6,279,668 B1 8/2001 Mercer
6,405,598 B1 6/2002 Bareggi
6,424,799 B1 7/2002 Gilmore
6,431,425 B1 8/2002 Moorman et al.
6,508,313 B1 1/2003 Carney et al.
6,520,270 B2 2/2003 Wissmach et al.
6,522,949 B1 2/2003 Ikeda et al.
6,598,684 B2 7/2003 Watanabe
6,668,212 B2 12/2003 Colangelo et al.
6,687,567 B2 2/2004 Watanabe
6,784,801 B2 8/2004 Watanabe et al.
6,836,614 B2 12/2004 Gilmore
6,848,516 B2 2/2005 Giardino
6,872,121 B2 3/2005 Wiener et al.
6,913,087 B1 7/2005 Brotto et al.
6,923,285 B1 8/2005 Rossow et al.
6,938,689 B2 9/2005 Farrant et al.
6,945,337 B2 9/2005 Kawai et al.
6,954,048 B2 10/2005 Cho
6,968,908 B2 11/2005 Tokunaga et al.
6,978,846 B2 12/2005 Kawai et al.
7,034,711 B2 4/2006 Sakatani et al.
7,035,710 B2 4/2006 Balling
7,035,898 B1 4/2006 Baker
7,036,605 B2 5/2006 Suzuki et al.
7,036,703 B2 5/2006 Grazioli et al.
7,062,998 B2 6/2006 Hohmann et al.
7,064,502 B2 6/2006 Garcia et al.
7,086,483 B2 8/2006 Arimura et al.
7,102,303 B2 9/2006 Brotto et al.
7,112,934 B2 9/2006 Gilmore
7,123,149 B2 10/2006 Nowak et al.
7,137,541 B2 11/2006 Baskar et al.
7,211,972 B2 5/2007 Garcia et al.
7,218,227 B2 5/2007 Davis et al.
7,243,440 B2 7/2007 DeKeyser
7,314,097 B2 1/2008 Jenner et al.
7,328,086 B2 2/2008 Perry et al.
7,328,757 B2 2/2008 Davies
7,343,764 B2 3/2008 Solfronk
7,346,422 B2 3/2008 Tsuchiya et al.
7,359,762 B2 4/2008 Etter et al.
7,382,272 B2 6/2008 Feight
7,419,013 B2 9/2008 Sainomoto et al.
7,428,934 B2 9/2008 Arimura
7,437,204 B2 10/2008 Lev-Ami et al.
7,464,769 B2 12/2008 Nakazawa et al.
7,501,778 B2 3/2009 Hashimoto et al.
7,540,334 B2 6/2009 Gass et al.
7,613,590 B2 11/2009 Brown
7,646,155 B2 1/2010 Woods et al.
RE41,185 E 3/2010 Gilmore et al.
7,690,569 B2 4/2010 Swanson et al.
7,750,811 B2 7/2010 Puzio et al.
7,787,981 B2 8/2010 Austin et al.
7,795,829 B2 9/2010 Seiler et al.
7,809,495 B2 10/2010 Leufen
7,817,062 B1 10/2010 Li et al.
7,823,458 B2 11/2010 Kibblewhite et al.
7,834,566 B2 11/2010 Woods et al.
7,868,591 B2 1/2011 Phillips et al.
7,898,403 B2 3/2011 Ritter et al.
7,900,524 B2 3/2011 Calloway et al.
7,911,379 B2 3/2011 Cameron
7,928,673 B2 4/2011 Woods et al.
7,931,096 B2 4/2011 Saha
7,942,084 B2 5/2011 Wilson, Jr. et al.
7,942,211 B2 5/2011 Scrimshaw et al.
7,953,965 B2 5/2011 Qin et al.
7,982,624 B2 7/2011 Richter et al.
8,004,397 B2 8/2011 Forrest et al.
8,004,664 B2 8/2011 Etter et al.
8,005,647 B2 8/2011 Armstrong et al.
8,044,796 B1 10/2011 Carr, Sr.
8,049,636 B2 11/2011 Buckingham et al.
8,074,731 B2 12/2011 Iwata et al.
8,169,298 B2 5/2012 Wiesner et al.
8,171,828 B2 5/2012 Duvan et al.
8,179,069 B2 5/2012 Matsunaga et al.
8,210,275 B2 7/2012 Suzuki et al.
8,255,358 B2 8/2012 Ballew et al.
8,260,452 B2 9/2012 Austin et al.
8,264,374 B2 9/2012 Obatake et al.
8,281,871 B2 10/2012 Cutler et al.
8,286,723 B2 10/2012 Puzio et al.
8,294,424 B2 10/2012 Bucur
8,310,206 B2 11/2012 Bucur
8,316,958 B2 11/2012 Schell et al.
8,324,845 B2 12/2012 Suzuki et al.
8,330,426 B2 12/2012 Suzuki et al.
8,351,982 B2 1/2013 Rofougaran
8,360,166 B2 1/2013 Imura et al.
8,406,697 B2 3/2013 Arimura et al.
8,412,179 B2 4/2013 Gerold et al.
8,438,955 B2 5/2013 Wilson, Jr. et al.
8,464,808 B2 6/2013 Leü
8,611,250 B2 12/2013 Chen et al.
8,627,900 B2 1/2014 Oomori et al.
8,645,176 B2 2/2014 Walton et al.
8,657,482 B2 2/2014 Malackowski et al.
8,666,936 B2 3/2014 Wallace
8,678,106 B2 3/2014 Matsunaga et al.
8,823,322 B2 9/2014 Noda et al.
8,890,449 B2 11/2014 Suzuki et al.
8,919,456 B2 12/2014 Ng et al.
8,925,645 B2 * 1/2015 Harada ............... B25B 23/1405 173/9
8,965,841 B2 2/2015 Wallace
9,030,145 B2 5/2015 Brennenstuhl et al.
9,031,585 B2 5/2015 Kahle et al.
9,038,743 B2 5/2015 Aoki
9,061,392 B2 6/2015 Forgues et al.
9,114,519 B2 8/2015 Iwata et al.
9,126,317 B2 9/2015 Lawton et al.
9,144,875 B2 9/2015 Schlesak et al.
9,193,055 B2 11/2015 Lim et al.
9,216,505 B2 12/2015 Rejman et al.
9,232,614 B2 1/2016 Hiro
9,233,457 B2 1/2016 Wanek et al.
9,242,356 B2 1/2016 King et al.
9,281,770 B2 3/2016 Wood et al.
2001/0052416 A1 12/2001 Wissmach et al.

(56) References Cited

U.S. PATENT DOCUMENTS

2002/0033267 A1 3/2002 Schweizer et al.
2002/0060082 A1* 5/2002 Watanabe ........... B25B 23/1405 173/176
2003/0121677 A1 3/2003 Kady et al.
2004/0182587 A1 9/2004 May et al.
2006/0009879 A1 1/2006 Lynch et al.
2006/0076385 A1 4/2006 Etter et al.
2007/0000676 A1* 1/2007 Arimura ............. B25B 23/1475 173/179
2007/0034394 A1 2/2007 Gass et al.
2007/0252675 A1 11/2007 Amar
2008/0084334 A1 4/2008 Ballew
2008/0086320 A1 4/2008 Ballew
2008/0086323 A1 4/2008 Ballew et al.
2008/0086349 A1 4/2008 Petrie et al.
2008/0086427 A1 4/2008 Petrie
2008/0086428 A1 4/2008 Wallace
2008/0086685 A1 4/2008 Janky et al.
2009/0250364 A1 10/2009 Gerold et al.
2009/0251330 A1 10/2009 Gerold et al.
2009/0273436 A1 11/2009 Gluck et al.
2010/0000749 A1* 1/2010 Andel .................. B25B 21/026 173/202
2010/0096151 A1 4/2010 Östling
2010/0116519 A1 5/2010 Gareis
2010/0154599 A1 6/2010 Gareis
2010/0176766 A1 7/2010 Brandner et al.
2010/0252287 A1* 10/2010 Morimura ............... B25F 5/005 173/9
2011/0056716 A1 3/2011 Jönsson et al.
2011/0067895 A1 3/2011 Nobe et al.
2011/0114346 A1* 5/2011 Suzuki ................ B25B 23/1405 173/2
2012/0167721 A1 7/2012 Fluhrer
2012/0168189 A1 7/2012 Eckert
2012/0199372 A1 8/2012 Nishikawa et al.
2012/0234566 A1* 9/2012 Mashiko ................. B25B 21/02 173/93.5
2012/0279736 A1 11/2012 Tanimoto et al.
2012/0292070 A1 11/2012 Ito et al.
2013/0024245 A1 1/2013 Nichols et al.
2013/0062086 A1 3/2013 Ito et al.
2013/0076271 A1 3/2013 Suda et al.
2013/0082632 A1 4/2013 Kusakawa
2013/0087355 A1 4/2013 Oomori et al.
2013/0109375 A1 5/2013 Zeiler et al.
2013/0118767 A1 5/2013 Cannaliato et al.
2013/0126202 A1 5/2013 Domori et al.
2013/0133907 A1 5/2013 Chen et al.
2013/0133911 A1 5/2013 Ishikawa et al.
2013/0138465 A1 5/2013 Kahle et al.
2013/0138606 A1 5/2013 Kahle et al.
2013/0153250 A1 6/2013 Eckert
2013/0187587 A1 7/2013 Knight et al.
2013/0188058 A1 7/2013 Nguyen et al.
2013/0191417 A1 7/2013 Petrie et al.
2013/0204753 A1 8/2013 Wallace
2013/0255980 A1 10/2013 Linehan et al.
2013/0304545 A1 11/2013 Ballew et al.
2013/0327552 A1 12/2013 Lovelass et al.
2013/0333910 A1 12/2013 Tanimoto et al.
2014/0006295 A1 1/2014 Zeiler et al.
2014/0069672 A1 3/2014 Mashiko et al.
2014/0107853 A1 4/2014 Ashinghurst et al.
2014/0122143 A1 5/2014 Fletcher et al.
2014/0151079 A1 6/2014 Furui et al.
2014/0159662 A1 6/2014 Furui et al.
2014/0159919 A1 6/2014 Furui et al.
2014/0159920 A1 6/2014 Furui et al.
2014/0166324 A1 6/2014 Puzio et al.
2014/0184397 A1 7/2014 Volpert
2014/0284070 A1 9/2014 Ng et al.
2014/0292245 A1 10/2014 Suzuki et al.
2014/0324194 A1 10/2014 Larsson et al.
2014/0331830 A1 11/2014 King et al.
2014/0334270 A1 11/2014 Kusakawa
2014/0336810 A1 11/2014 Li et al.
2014/0336955 A1 11/2014 Li et al.
2014/0350716 A1 11/2014 Fly et al.
2014/0365259 A1 12/2014 Delplace et al.
2014/0367134 A1 12/2014 Phillips et al.
2014/0374130 A1 12/2014 Nakamura et al.
2014/0379136 A1 12/2014 Schlegel et al.
2015/0000944 A1 1/2015 Dusselberg et al.
2015/0002089 A1 1/2015 Rejman et al.
2015/0042247 A1 2/2015 Kusakawa
2015/0122524 A1 5/2015 Papp
2015/0135306 A1 5/2015 Winkler et al.
2015/0135907 A1 5/2015 Hirabayashi et al.
2015/0137721 A1 5/2015 Yamamoto et al.
2015/0144365 A1* 5/2015 Hirabayashi ........ B25B 23/1405 173/2
2015/0158157 A1 6/2015 Hirabayashi et al.
2015/0158165 A1* 6/2015 McClung ............ B25B 23/1453 173/95
2015/0158170 A1 6/2015 Nitsche et al.
2015/0165604 A1* 6/2015 Bartoszek ............... B25B 21/02 173/1
2015/0171654 A1 6/2015 Horie et al.
2015/0340921 A1 11/2015 Suda et al.
2016/0031072 A1 2/2016 Lim et al.
2016/0250738 A1 9/2016 Leh et al.
2017/0008159 A1 1/2017 Boeck et al.

FOREIGN PATENT DOCUMENTS

EP 2147750 A1 1/2010
JP 7116969 5/1995
JP H10151578 A 6/1998
JP 2000176850 A 6/2000
JP 2004072563 3/2004
JP 2004322262 11/2004
JP 2006123080 5/2006
JP 4359018 11/2009
WO 2002030624 4/2002
WO 2007090258 8/2007
WO 2013116303 8/2013

* cited by examiner

ADAPTIVE IMPACT BLOW DETECTION

RELATED APPLICATIONS

This application is a continuation of U.S. patent application Ser. No. 16/796,594, filed on Feb. 20, 2020, which is a continuation of U.S. patent application Ser. No. 15/146,563, filed on May 4, 2016, now U.S. Pat. No. 10,603,770, which claims the benefit of U.S. Provisional Patent Application No. 62/156,864, filed on May 4, 2015, the entire content of each of which is hereby incorporated by reference.

FIELD OF THE INVENTION

The present invention relates to monitoring the number of impacts delivered by a power tool.

SUMMARY

In some embodiments, a power tool is able to achieve consistent number of impacts in an effort to generate a consistent torque output over repeated trials of the same application. The power tool closely approximates the behavior of torque-specific impact drivers and wrenches without requiring the use of a torque transducer.

By monitoring a combination of several motor parameters, the impact detection algorithm is able to limit the tool's impacts to a consistent number regardless of motor speed or battery charge.

In one embodiment, the invention provides a power tool including a housing, an anvil supported by the housing, a motor positioned within the housing and configured to drive the anvil, and a hammer mechanically coupled to the motor. The hammer is configured to deliver a plurality of impacts to the anvil. The power tool also includes a motor control unit electrically coupled to the motor and to the hammer. The motor control unit is configured to determine a motor characteristic indicative of a speed of the motor. When the motor characteristic indicates that the speed of the motor is below a speed threshold, the motor control unit employs an acceleration-based technique to detect a first impact based on a change in motor acceleration and generate a first impact indication in response to detecting the first impact. When the motor characteristic indicates that the speed is above the speed threshold, the motor control unit employs a time-based technique to detect a second impact based on an elapsed time and generates a second impact indication in response to detecting the second impact.

In one embodiment, the invention provides a method of detecting an impact of a power tool including driving, by a motor, a hammer of the power tool to deliver impacts to an anvil of the power tool. The method further includes determining a motor characteristic indicative of a speed of the motor. When the motor characteristic indicates that the speed of the motor is below a speed threshold, the method includes employing an acceleration-based technique to detect a first impact based on a change in motor acceleration and generating a first impact indication in response to detecting the first impact. When the motor characteristic indicates that the speed is above the speed threshold, the method includes employing a time-based technique to detect a second impact based on an elapsed time and generating a second impact indication in response to detecting the second impact.

In one embodiment, the invention provides a method of detecting an impact of a power tool including driving, by a motor, a hammer of the power tool to deliver impacts to an anvil of the power tool and determining a motor characteristic indicative of a speed of the motor. The method further includes setting an acceleration threshold based on the motor characteristic and detecting an impact based on a change in motor acceleration exceeding the acceleration threshold. The method also includes generating an impact indication in response to detecting the impact.

In one embodiment, the invention provides a power tool including a housing, an anvil supported by the housing, a motor positioned within the housing and configured to drive the anvil, and a hammer mechanically coupled to the motor. The hammer is configured to deliver a plurality of impacts to the anvil. The power tool also includes a motor control unit electrically coupled to the motor and to the hammer. The motor control unit is configured to determine a desired number of delivered impacts to the anvil, determine a motor speed at which the motor drives the anvil, monitor the number of delivered impacts to the anvil according to one selected from a group consisting of an acceleration-based algorithm and a time-based algorithm based on the motor speed, and control the motor based on the number of delivered impacts to the anvil.

In another embodiment the invention provides a power tool including a housing, an anvil supported by the housing, a motor positioned within the housing and configured to drive the anvil, and a hammer mechanically coupled to the motor. The hammer is configured to deliver a plurality of impacts to the anvil. The power tool also includes a motor control unit electrically coupled to the motor and to the hammer. The motor control unit is configured to determine a desired number of delivered impacts to the anvil, receive signals from sensors, the signals indicative of a parameter of motor motion, and calculate, from the received signals, a motor acceleration. The motor control unit is also configured to monitor changes in motor acceleration, determine whether a change in motor acceleration exceeds a variable acceleration threshold, and detect that an impact is delivered when the motor acceleration exceeds the variable acceleration threshold.

Other aspects of the invention will become apparent by consideration of the detailed description and accompanying drawings.

DETAILED DESCRIPTION

Figure 1:
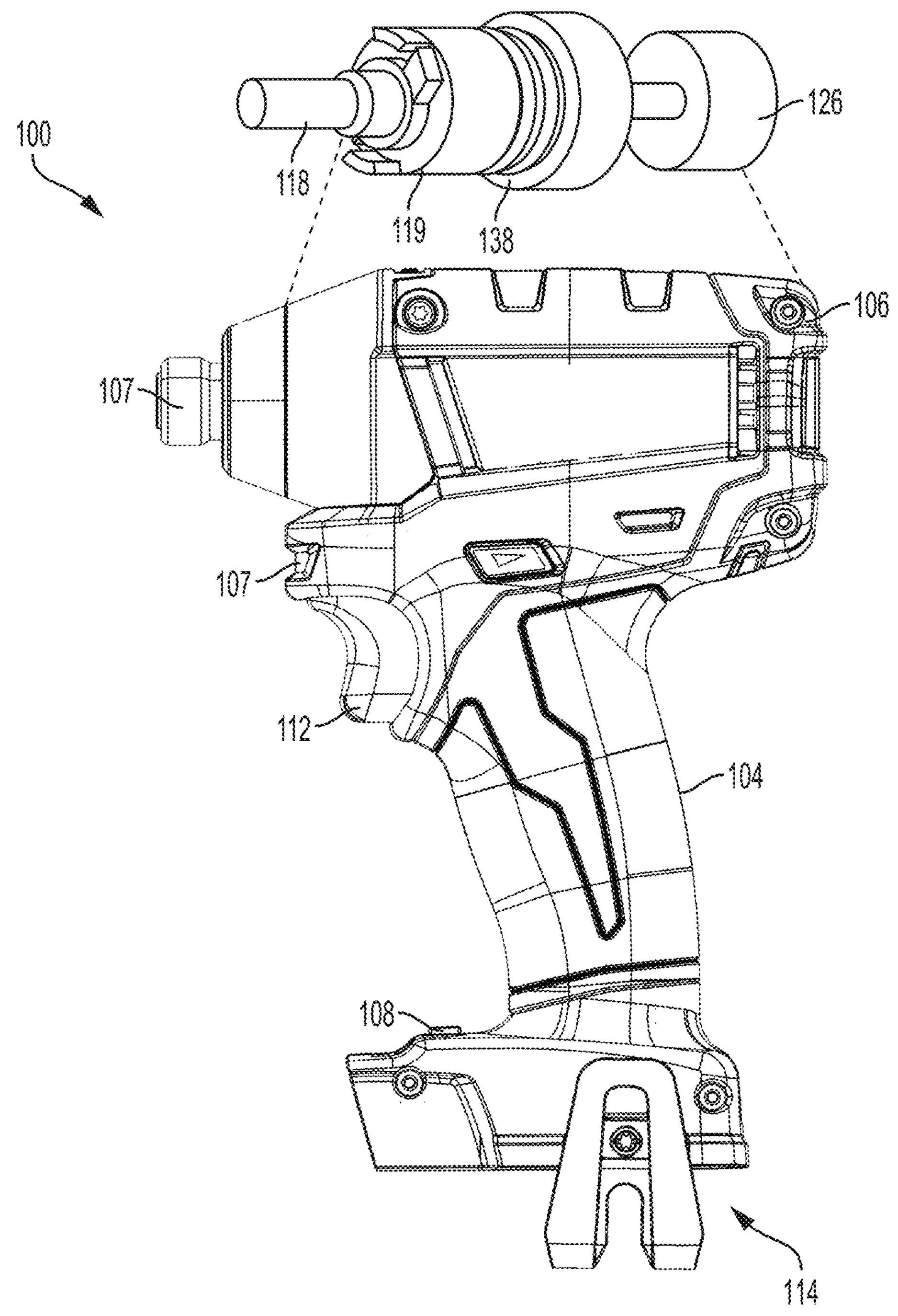
FIG. 1 illustrates a power tool according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a power tool 100 incorporating a direct current (DC) motor 126. In a brushless motor power tool, such as power tool 100, switching elements are selectively enabled and disabled by control signals from a controller to selectively apply power from a power source (e.g., battery pack) to drive a brushless motor. The power tool 100 is a brushless hammer drill having a housing 102 with a handle portion 104 and motor housing portion 106. The power tool 100 further includes an output unit 107, mode select button 108, forward/reverse selector 110, trigger 112, battery interface 114, and light 116.

The power tool 100 also includes an anvil 118, and a hammer 119 positioned within the housing 102 and mechanically coupled to the motor 126. The hammer 119 is coupled to the anvil 118 via a spring. The hammer 119 impacts the anvil 118 periodically to increase the amount of torque delivered by the power tool 100 (e.g., the anvil 118 drives the output unit 107). During an impacting event or cycle, as the motor 126 continues to rotate, the power tool 100 encounters a higher resistance and winds up the spring coupled to the hammer 119. As the spring compresses, the spring retracts toward the motor 126 and pulling along the hammer 119 until the hammer 119 disengages from the anvil 118 and surges forward to strike and re-engage the anvil 118. An impact refers to the event in which the spring releases and the hammer 119 strikes the anvil 118. The impacts increase the amount of torque delivered by the anvil 118.

Figure 2:
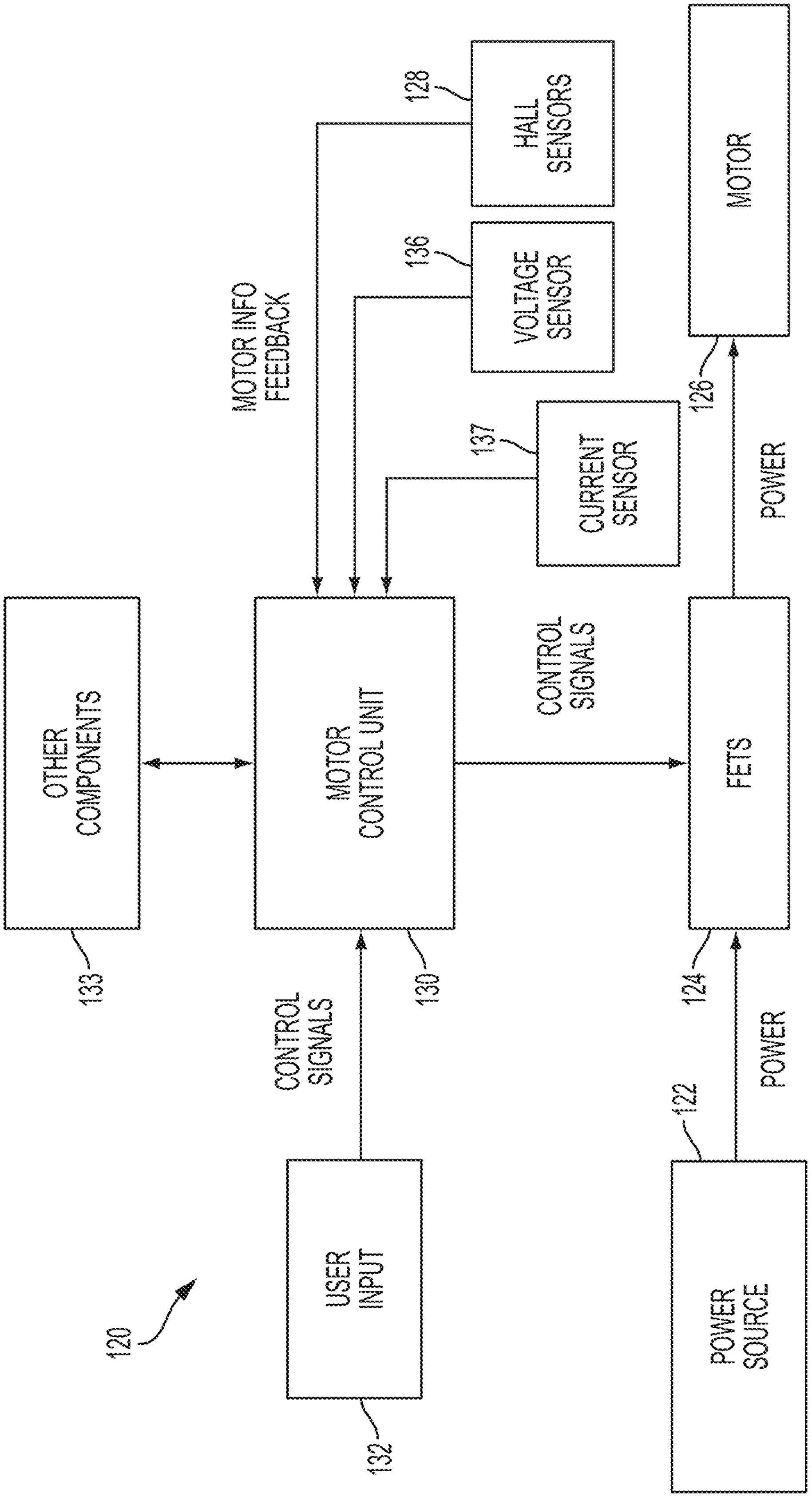
FIG. 2 illustrates a block diagram of the power tool.

FIG. 2 illustrates a simplified block diagram 120 of the brushless power tool 100, which includes a power source 122, Field Effect Transistors (FETs) 124, a motor 126, Hall sensors 128, a motor control unit 130, user input 132, and other components 133 (battery pack fuel gauge, work lights (LEDs), etc.), a voltage sensor 136, and a current sensor 137. The power source 122 provides DC power to the various components of the power tool 100 and may be a power tool battery pack that is rechargeable and uses, for instance, lithium ion cell technology. In some instances, the power source 122 may receive AC power (e.g., 120V/60 Hz) from a tool plug that is coupled to a standard wall outlet, and then filter, condition, and rectify the received power to output DC power. Each Hall sensor 128 outputs motor feedback information, such as an indication (e.g., a pulse) of when a magnet of the rotor rotates across the face of that Hall sensor. Based on the motor feedback information from the Hall sensors 128, the motor control unit 130 can determine the position, velocity, and acceleration of the rotor. The motor control unit 130 also receives user controls from user input 132, such as by depressing the trigger 112 or shifting the forward/reverse selector 110. In response to the motor feedback information and user controls, the motor control unit 130 transmits control signals to control the FETs 124 to drive the motor 126. By selectively enabling and disabling the FETs 124, power from the power source 122 is selectively applied to stator coils of the motor 126 to cause rotation of a rotor. The motor control unit 130 also receives voltage information from the voltage sensor 136 and current information from the current sensor 137. More particularly, the motor control unit 130 receives signals from the voltage sensor 136 indicating a voltage across the motor 126, and receives signals from the current sensor 137 indicating a current through the motor 126. Although not shown, the motor control unit 130 and other components of the power tool 100 are electrically coupled to the power source 122 such that the power source 122 provides power thereto.

In the illustrated embodiment, the motor control unit 130 is implemented by a processor or microcontroller. In some embodiments, the processor implementing the motor control unit 130 also controls other aspects of the power tool 100 such as, for example, operation of the work light 116 and/or the fuel gauge. The power tool 100 is configured to control the operation of the motor based on the number of impacts executed by the hammer portion of the power tool 100. The motor control unit 130 monitors the voltage of the motor 126, the current through the motor 126, and the motor's acceleration to detect the number of impacts executed by the power tool 100 and control the motor 126 accordingly. By monitoring the motor voltage, the motor current, and the motor acceleration, the motor control unit 130 can effectively control the number of impacts over the entire range of the tool's battery charge and motor speeds (i.e., regardless of the battery charge or the motor speed).

The motor control unit 130 executes different impacting detection techniques, or, algorithms, based on the motor speed. When the motor operates in low to medium speeds, the motor control unit 130 executes an acceleration based impacting detection algorithm, but when the motor operates in high speeds, the motor control unit 130 executes a time-based impacting detection algorithm. In other words, the motor control unit 130 determines the number of impacts based on different parameters depending on the motor speed.

When the motor operates in low to medium speeds, the motor control unit 130 mainly monitors motor acceleration and executes the acceleration based impacting detection algorithm. The motor control unit 130 receives each millisecond, for example, signals indicative of the motor velocity from the Hall effect sensors 128. The motor control unit 130 then calculates motor acceleration by taking the difference between two motor velocity measurements over an elapsed millisecond. The motor control unit 130 determines, based on the calculated motor acceleration, when the motor increases speed and when the motor decreases speed. As discussed previously, the motor 126 winds up the spring 138. As the spring 138 winds up, the load to the motor 126 increases. The motor 126 then slows down (i.e., decelerates) in response to the increasing load. Eventually, the hammer 119 disengages the anvil 118 and the spring 138 releases. When the spring 138 releases, the hammer 119 surges forward and strikes the anvil 118 generating an impact. As the spring 138 releases, the load to the motor 126 decreases and the motor 126 increases speed (i.e., accelerates). This process (e.g., decelerating the motor as the spring 138 is wound, and accelerating the motor as the spring 138 releases) is repeated during each impact and results in an oscillation in motor acceleration.

Figure 4:
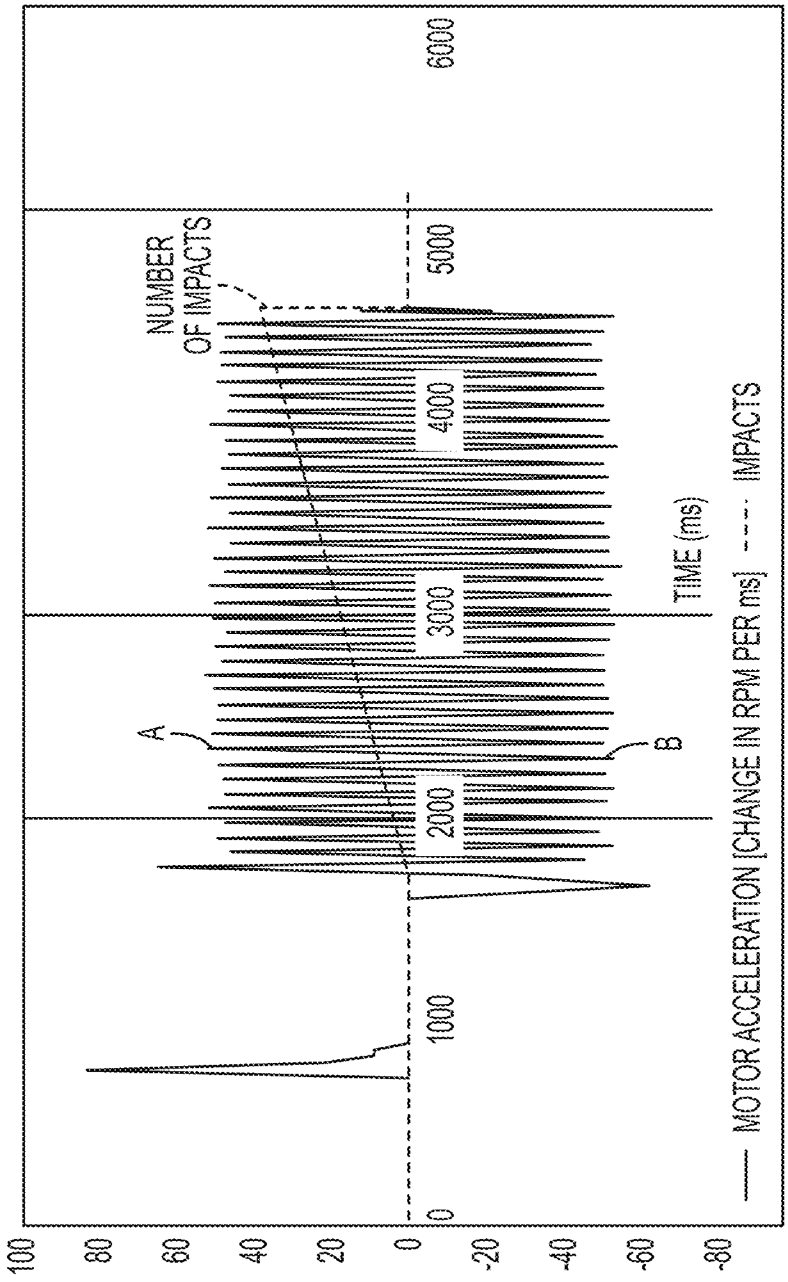
FIG. 4 illustrates a graph showing changes in motor acceleration in low motor speeds.

In the acceleration based impacting detection algorithm, the motor control unit 130 monitors the oscillations (i.e., the changes or variations) in motor acceleration to detect when each impacting event occurs. The motor control unit 130 tracks (e.g., stores in non-volatile memory) the minimum and maximum accelerations reached by the motor 126. The motor control unit 130 detects an impact when the minimum and maximum accelerations differ by a specified threshold. When the motor control unit 130 detects an impact, the motor control unit 130 increments an impact counter. FIG. 4 illustrates an exemplary graph of motor acceleration. The y-axis represents motor acceleration in change in rotations per minute (RPM) per millisecond (ΔRPM/millisecond) and the x-axis represents time in milliseconds. As shown in FIG. 4, when the change in acceleration is greater than an acceleration threshold (e.g., 3-33 units of change in RPM per millisecond), the motor control unit 130 detects an impact and increments the impact counter.

The specific acceleration threshold used by the motor control unit 130 to detect an impact is calculated using the motor voltage, which is indicative of motor speed. The motor control unit 130 calculates the motor voltage by multiplying the battery voltage by the motor drive duty cycle. When the motor voltage is low, the motor speed is also low since little voltage is provided to the motor 126. Analogously, when the motor voltage is high, the motor speed is also high since a higher voltage is provided to the motor 126. Therefore, the acceleration threshold changes according to the motor speed. When the motor voltage is low, the motor turns slowly (i.e., motor speed is low), which causes the motor 126 to have little momentum. In such instances (e.g., when the motor voltage is low), a varying load on the motor 126 drastically changes the motor acceleration. Consequently, the motor 126 experiences large swings in acceleration during the impacting cycle (see FIG. 4) when the motor voltage is low. Due to these large swings in motor acceleration, a relatively large acceleration threshold can be used to determine whether or not an impact has occurred (e.g., to detect when an impact occurred).

Figure 3:
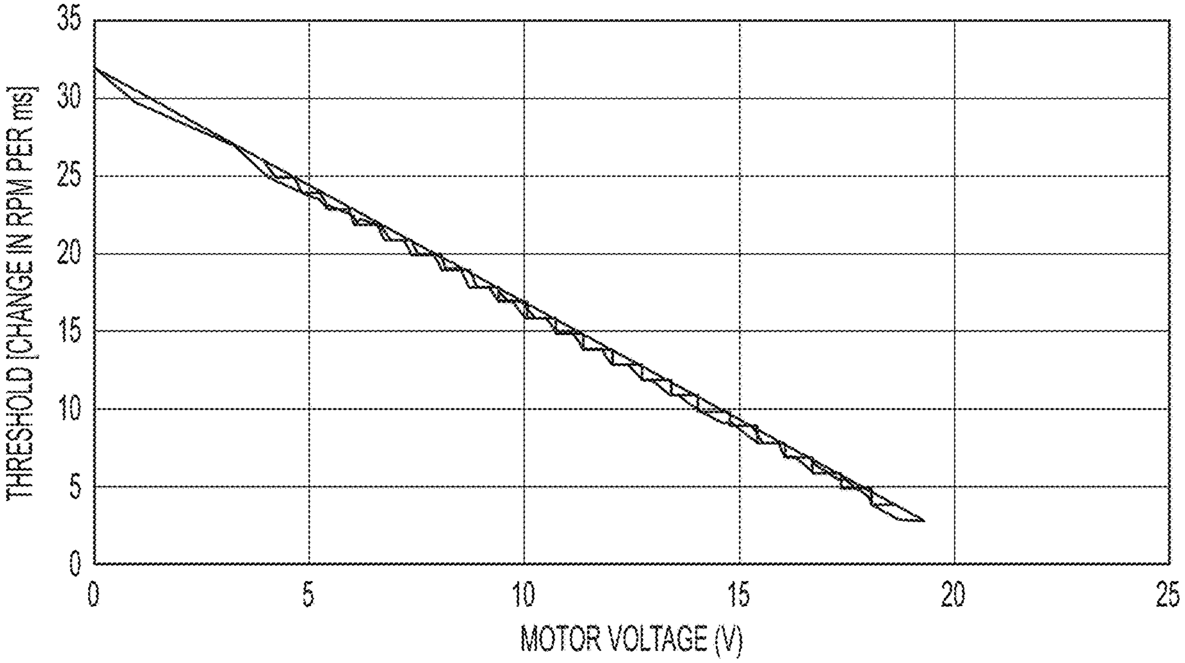
FIG. 3 illustrates a graph showing a linear relationship between an acceleration threshold and motor voltage.

However, as the motor voltage increases, the motor speed also increases, which increases the motor momentum. Since the motor momentum is higher, the motor does not experience as large of swings in motor acceleration during an impacting cycle. Rather, the difference between the maximum motor acceleration and the minimum motor acceleration (e.g., the acceleration swings) decreases as the motor voltage increases. To accommodate for the changes in experienced acceleration swings (e.g., the difference between maximum motor acceleration and minimum motor acceleration), the impact detection algorithm implemented by the motor control unit 130 decreases the impact acceleration threshold in a linear fashion as the motor voltage increases, as shown in FIG. 3.

Figure 5:
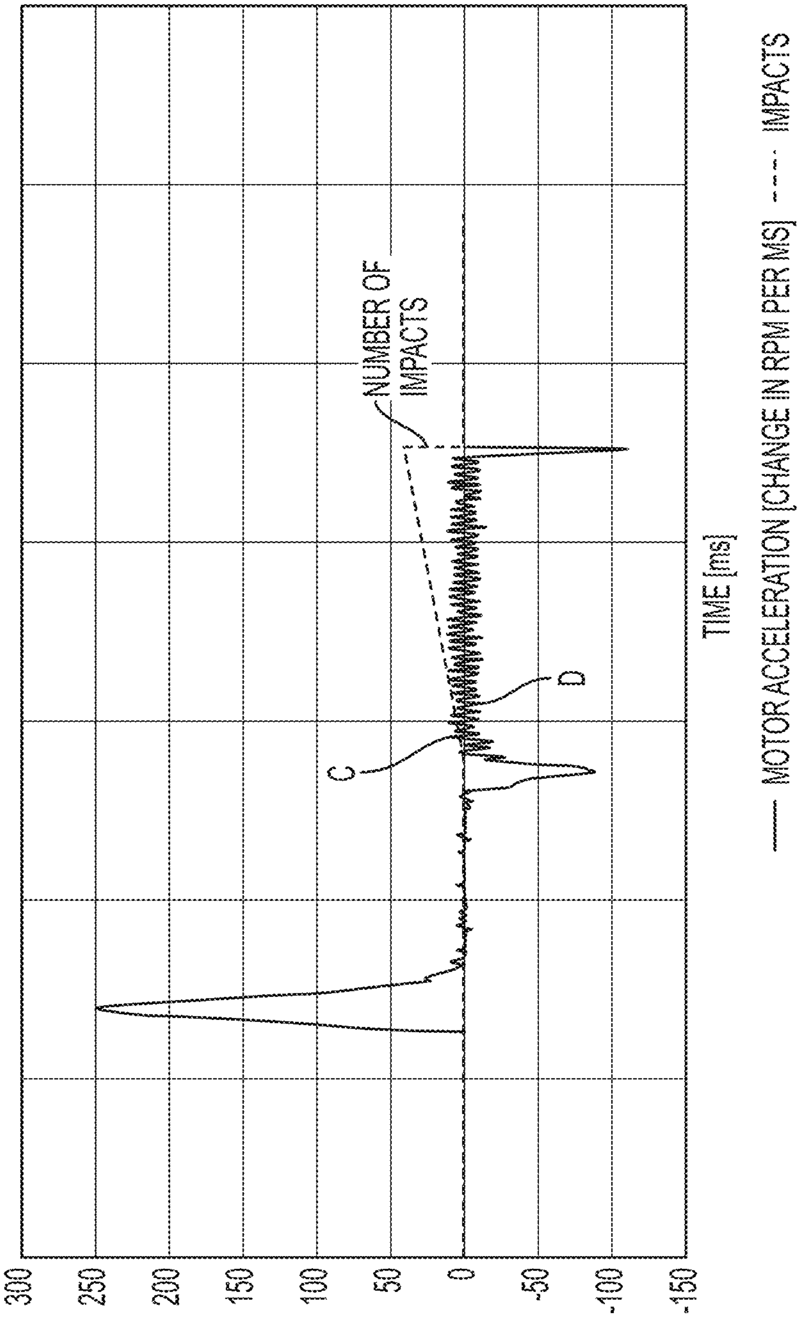
FIG. 5 illustrates a graph showing changes in motor acceleration in medium motor speeds.

For example, FIG. 4 illustrates the changes in motor acceleration when the motor voltage is approximately 5V. As shown in FIG. 4, the maximum acceleration reached by the motor 126 is approximately 50 ΔRPM/millisecond at point A while the minimum acceleration experienced by the motor 126 is approximately −50 ΔRPM/millisecond at point B. Accordingly, FIG. 4 illustrates the motor 126 experiencing an acceleration difference of approximately 100 ΔRPM/millisecond (e.g., difference between the maximum and the minimum acceleration). On the other hand, FIG. 5 illustrates the changes in motor acceleration when the motor voltage is approximately 15V. As shown in FIG. 5, the maximum acceleration experienced by the motor 126 is approximately 20 ΔRPM/millisecond at point C while the minimum acceleration experienced by the motor 126 is approximately −20 ΔRPM/millisecond at point D. Accordingly, FIG. 5 illustrates the motor 126 experiencing an acceleration difference of approximately 40 ΔRPM/millisecond. Consequently, to accurately detect an impacting event regardless of the motor speed, the threshold in change of acceleration to detect an impact shifts from approximately 25 to 10 from FIG. 4 and FIG. 5, respectively. In other words, the motor control unit 130 decreases the impact acceleration threshold in a linear fashion as the motor voltage increases, as shown in FIG. 3.

The motor control unit 130 continues to operate the motor 126 until the impact counter reaches a desired number of impacts. Once the motor control unit 130 determines that the power tool 100 executed the desired number of impacts, the motor control unit 130 changes the operation of the motor 126. For instance, changing the motor operation can include stopping the motor 126, increasing or decreasing the speed of the motor 126, changing the rotation direction of the motor 126, and/or another change of motor operation. The particular change in motor operation can depend on a current mode of the tool selected by a user via user input 132. To receive the mode selection, the user input 132 may include manually-operable switches or buttons on an exterior portion of the tool 100 or may include a wired or wireless communication interface for communicating with an external device (e.g., laptop, tablet, smart phone). For instance, in a first mode, the motor 126 stops when the impact threshold is reached. In another mode, the motor 126 slows when a first impact threshold is reached, and stops when a second impact threshold is reached. In yet another mode, the motor 126 decreases speed when a first impact threshold is reached.

When the motor control unit 130 detects that the motor 126 is no longer operating (e.g., using the signals from the Hall effect sensors 128), the motor control unit 130 resets the impact counter to 0 to begin the next operation. The motor control unit 130 can also determine that the motor 126 is no longer executing impacting events when the time between consecutive events exceeds a predetermined end-of-impacting threshold. The time value used as the end-of-impacting threshold is determined experimentally by measuring the time the power tool 100 takes to complete an impacting event when running in the power tool's lowest impacting speed and while powered with a battery that has low battery charge.

Figure 6:
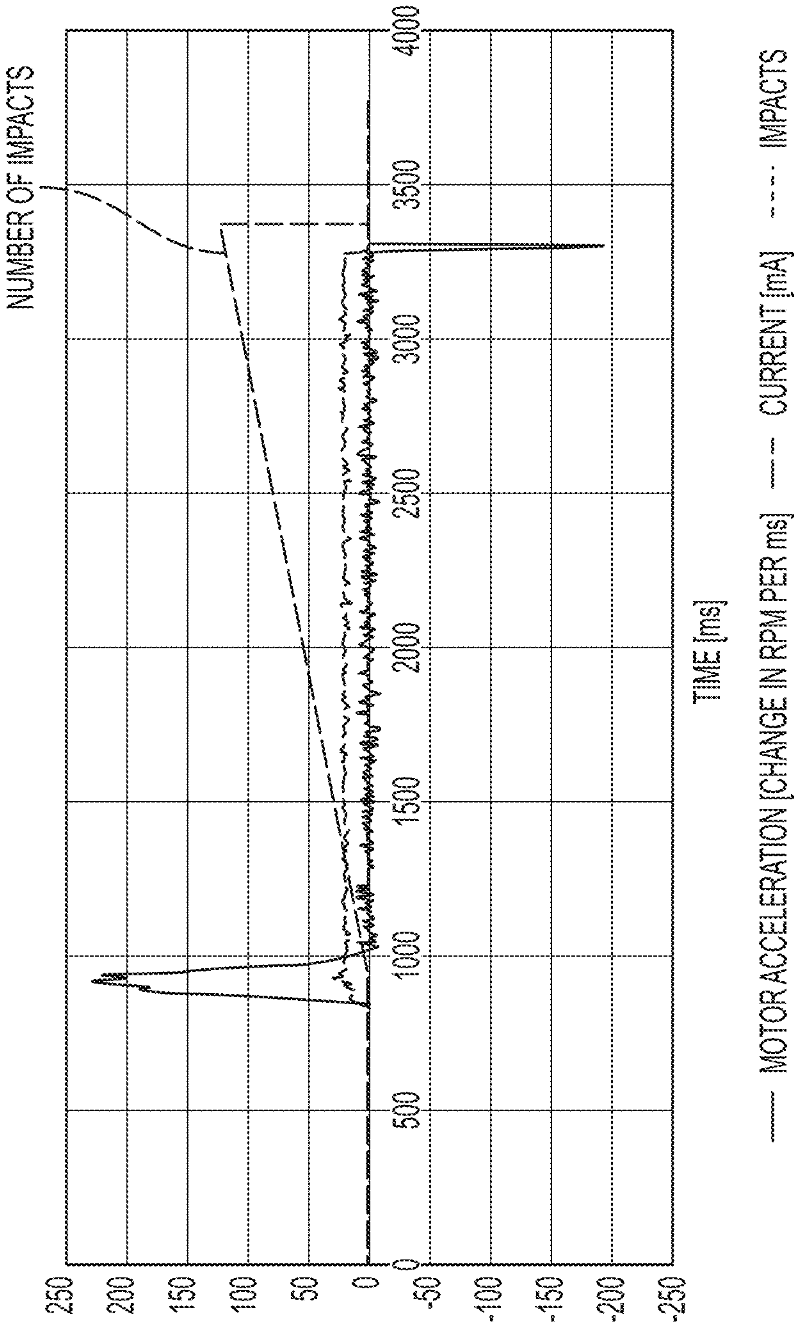
FIG. 6 illustrates a graph showing changes in motor acceleration in high motor speeds.

While monitoring changes in motor acceleration gives an accurate indication of the number of impacting events when the motor operates at a lower speed, after the motor 126 reaches a particular speed, the motor momentum becomes sufficient to power through multiple impacting events (winding up the spring and striking the anvil), making the change in acceleration and/or deceleration less noticeable. In other words, the varying load during an impacting event has less effect on the motor 126 after the motor speed exceeds a predetermined speed threshold, as shown in FIG. 6 and, therefore, impacts are more challenging to detect based on changes in motor acceleration. The motor control unit 130 determines that the motor speed exceeds the predetermined speed threshold by monitoring the motor voltage because the motor speed is proportional to the motor voltage. The motor control unit 130 monitors the motor voltage to determine when the motor voltage exceeds a predetermined high motor voltage threshold. In the illustrated embodiment, the high motor voltage threshold is 16V, although other values may be used in other embodiments.

When the motor control unit 130 determines that the motor voltage exceeds (e.g., is greater than or equal to) the high motor voltage threshold, the motor control unit 130 switches to a time-based impacting detection algorithm. The time-based impacting detection algorithm uses a timer to estimate the number of impacts delivered by the anvil during a predetermined time period instead of detecting each impacting event as was done with the acceleration-based impacting detection algorithm.

In the time-based impacting detection algorithm, the motor control unit 130 first determines when impacting begins, then determines the approximate period of time necessary to reach the desired torque. The motor control unit 130 after detecting that impacting has begun, begins the timer. When the timer is up (i.e., the predetermined period of time has elapsed), the motor control unit 130 ceases motor operation.

The motor control unit 130 monitors the motor current to determine when impacting begins. In particular, the motor control unit 130, determines when the motor current exceeds a predetermined motor current threshold and the motor acceleration is approximately 0. In the illustrated embodiment, the predetermined motor current threshold is determined by experimentally measuring the motor current at which the tool begins to execute impacting events. In other embodiments, the motor current can be determined by other methods. For example, the motor current can be determined theoretically through various calculations taking into account various motor characteristics. A zero motor acceleration is indicative of a trigger not being pulsed. Therefore, the motor control unit 130 determines that the motor current is high enough that impacting events are beginning to occur and that the trigger is not pulsed.

Once the motor control unit 130 determines that impacting has begun as described above, the motor control unit 130 starts a timer for a variable amount of time. The amount of time set for the timer changes according to the desired torque output or the desired total number of impacting events. The amount of time is calculated by the motor control unit 130 by multiplying the desired number of impacts by the amount of time in which an impacting event is completed. In the illustrated embodiment, the motor control unit 130 uses a preprogrammed or predetermined time period calculated for the tool to complete one impacting event. In other words, the amount of time in which an impacting event is completed is predetermined, and the motor control unit 130 uses this predetermined speed to calculate the amount of time for the timer based on the desired number of impacts. For example, if the motor control unit 130 is trying to detect 20 impacts assuming 20 milliseconds per impact, the motor control unit 130 will assume 20 impacts have occurred 400 milliseconds after the motor current first exceeds the specified current threshold.

In the illustrated embodiment, the amount of time in which an impacting event is completed is experimentally measured when running the power tool 100 at full speed. In other embodiments, however, the amount of time in which an impacting event is completed may be determined by the motor control unit 130 based on the current motor speed or the motor speed when impacting begins. For example, the motor control unit 130 may access a table or similar association structure that associates a plurality of motor speeds with a plurality of time periods. The time periods are indicative of the amount of time in which an impacting event is completed. Accordingly, the motor control unit 130 can determine, based on the motor speed at which impacting begins, the time period required to complete one impacting cycle at the particular motor speed.

Once the timer set by the motor control unit 130 expires, the motor control unit 130 changes the operation of the motor 126. Changing the motor operation can include stopping the motor 126, increasing or decreasing the speed of the motor 126, changing the rotation direction of the motor 126, and/or another change of motor operation. As described above, the particular change in motor operation can depend on a current mode of the tool selected by a user via user input 132. When the motor control unit 130 determines that the motor current drops below (e.g., is less than or equal to) a low motor current threshold, the motor control unit 130 resets the number of detected impacts to 0 to be ready for the next operation.

The motor control unit 130 monitors motor speed even during a single trigger pull to determine which impact detecting algorithm to implement. In other words, if the motor speed changes significantly within a single trigger pull, the motor control unit 130 switches impact detecting algorithms based on the change of motor speed. In some embodiments, the motor control unit 130 changes the speed of the motor during a single trigger pull. For example, a single trigger pull may cause the motor 126 to begin rotating slower and build up speed to finish rotating at a faster speed. In such embodiments, the motor control unit 130 starts by implementing the acceleration based impact detecting algorithm until the motor speed exceeds a high motor speed threshold, and then the motor control unit 130 switches to implement the time-based impact detecting algorithm until the desired number of impacts are delivered. In such embodiments an impact counter would begin counting each impact detected since the acceleration based algorithm detects individual impacts, and after the motor speed exceeds the high motor speed threshold, the impact counter may increment the counter every 20 milliseconds, for example.

Accordingly, the motor control unit 130 monitors changes in impact acceleration to detect impacts, adjusts the change-in-acceleration threshold that is used to detect an impact based on the speed of the motor (proportional to the motor voltage), switches between counting individual impacts (i.e., the acceleration based impacting detection algorithm) and estimating impacts based on elapsed time (i.e., the time-based impacting detection algorithm) based on the momentum of the motor, and uses a motor current threshold to determine when the tool is (or begins) impacting while the motor is running at or near full speed.

Figure 7:
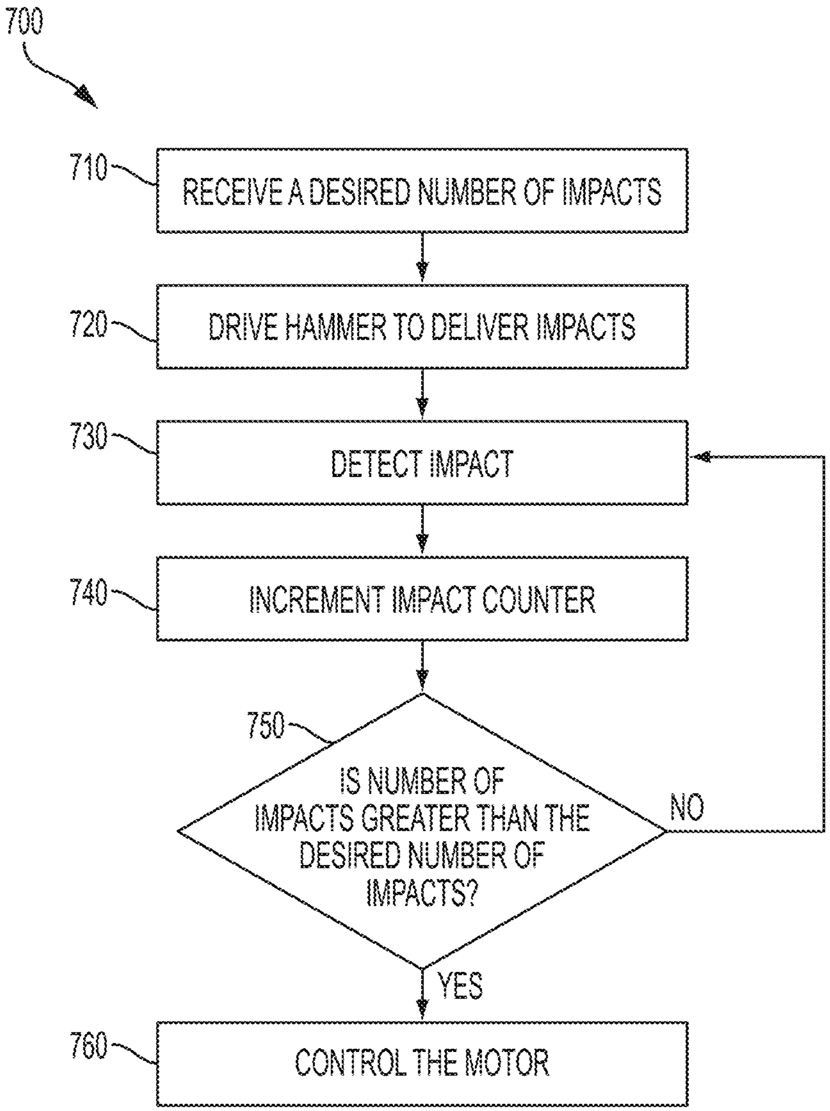
FIG. 7 illustrates a flowchart of a method of monitoring a number of delivered impacts of the power tool of FIG. 1.

FIG. 7 illustrates a flowchart of a method 700 of monitoring the number of impacts delivered by the anvil. At step 710, the motor control unit 130 receives a desired number of impacts to be delivered. In some embodiments, the motor control unit 130 receives the desired number of impacts from a user interface of the power tool 100 or through a user interface of an application executing on an external device (e.g., a mobile phone) in communication with the power tool 100. In other embodiments, the motor control unit 130 is preprogrammed with a desired number of impacts that are received at the time of manufacture.

At step 720, the motor control unit 130 drives the hammer to deliver impacts to the anvil. As described above, in some embodiments, the motor control unit 130 drives the motor 126 to drive the hammer. At step 730, the motor control unit 130 detects an impact delivered by the hammer according to an acceleration-based technique or a time-based technique. When the motor control unit 130 detects an impact, the motor control unit 130 increments an impact counter (at step 740).

At step 750, the motor control unit 130 determines whether the number of impacts is greater than the desired number of impacts. When the number of impacts is greater than the desired number of impacts, the motor control unit 130 controls the motor 126 (step 760). For example, the motor control unit 130 may stop the motor 126, increase the speed of the motor 126, decrease the speed of the motor 126, change the rotation direction of the motor 126, or otherwise change an operation of the motor 126. When the number of impacts is below the desired number of impacts, the motor control unit 130 returns to step 730 to detect a further impact.

Figure 8:
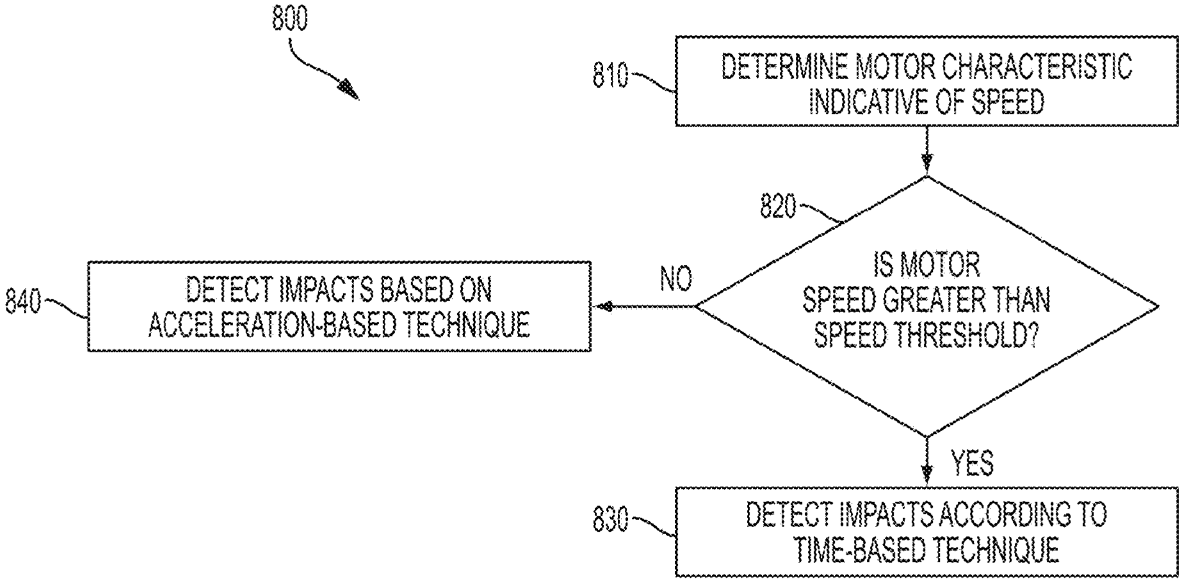
FIG. 8 illustrates a flowchart of a method of monitoring a number of delivered impacts of the power tool of FIG. 1.

FIG. 8 illustrates a flowchart of a method 800 of detecting an impact delivered by the anvil, which may be used to implement step 730 of FIG. 7. At step 810, the motor control unit 130 determines a motor characteristic indicative of a motor speed. In some embodiments, the motor control unit 130 determines the motor speed based on detecting a voltage of the motor 126. In other embodiments, the motor control unit 130 determines the motor speed based on outputs of the Hall sensors 128. At step 820, the motor control unit 130 determines whether the motor speed is greater than a speed threshold. In some embodiments, the motor control unit 130 determines that the motor speed exceeds the speed threshold when the motor voltage exceeds a predetermined high-motor voltage threshold, for example, 16V.

When the motor speed exceeds the speed threshold, the motor control unit 130 detects an impact according to the time-based technique (at step 830). When the motor speed is below the speed threshold, the motor control unit 130 detects an impact according to the acceleration-based technique (at step 840).

Figure 9:
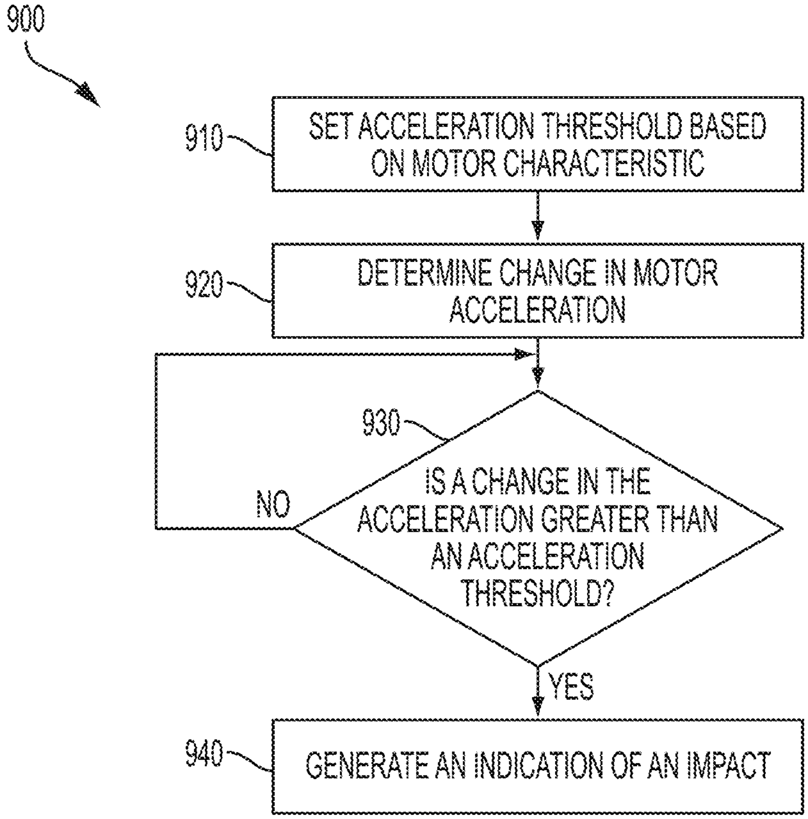
FIG. 9 illustrates a flowchart of a method of acceleration-based impact monitoring of the power tool of FIG. 1.

FIG. 9 illustrates a flowchart of an acceleration-based method 900 of monitoring impacts, which may be used to implement step 840 of FIG. 8. At step 910, the motor control unit 130 sets an acceleration threshold based on the motor characteristic indicative of speed (e.g., as obtained in step 810 of FIG. 8). As described above, generally, as the speed of the motor increases, the value at which the acceleration threshold is set decreases. At step 920, the motor control unit 130 determines a change in motor acceleration. As described above, in some embodiments, the motor control unit 130 determines the motor acceleration by taking the difference between two motor velocity measurements over an elapsed time period (e.g., a millisecond).

At step 930, the motor determines whether the change in motor acceleration exceeds a predetermined acceleration threshold. When the change in motor acceleration exceeds the acceleration threshold, the motor control unit 130 generates an indication of an impact and increments an impact counter (at step 940). The indication may be output by the motor control unit 130 or may be, for example, generated internally in software. For example, the indication may be generated by way of a variable being updated in memory of the motor control unit or an instruction being executed, which then results in an increment of the impact counter (see step 740 of FIG. 7).

Figure 10:
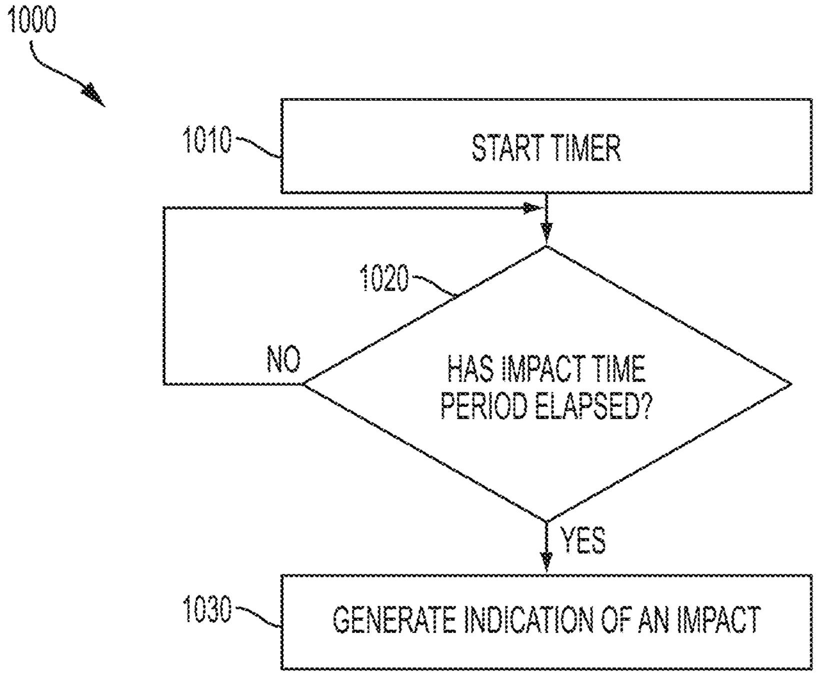
FIG. 10 illustrates a flowchart of a method of time-based impact monitoring of the power tool of FIG. 1.

FIG. 10 illustrates a time-based method 1000 of monitoring impacts, which may be used to implement step 830 of FIG. 8. At step 1010, the motor control unit 130 starts a timer based on detecting that impacting has begun. At step 1020, the motor control unit 130 determines whether an impact time period has elapsed based on the timer. As noted above, the impact time period may vary depending on the speed of the motor. For example, in some embodiments, the method 1000 includes a step of setting the impact time period (e.g., before the timer starts in step 1010) based on a speed of the motor. Generally, the faster the motor speed, the shorter the impact time period.

When the impact time period elapses, the motor control unit 130 generates an indication of an impact and increments an impact counter (at step 1030). The indication may be output by the motor control unit 130 or may be, for example, generated internally in software. For example, the indication may be generated by way of a variable being updated in memory of the motor control unit or an instruction being executed, which then results in an increment of the impact counter (see step 740 of FIG. 7).

In some embodiments, the method 1000 further includes a determination that motor current exceeds a current threshold before starting the timer in step 1010 to ensure that the tool is operating in a state that will result in impacting. In some embodiments, the method 800 (FIG. 8) includes a step of determining that the motor current exceeds a current threshold before proceeding to the time-based technique in step 830. For example, in step 820, the control unit 130 may also compare the motor current to the current threshold and proceeds to step 830 if both the motor current exceeds the current threshold and the motor speed exceeds the speed threshold; otherwise, the motor control unit 130 proceeds to step 840 for acceleration-based impact detection. This step is, again, to ensure that the tool is operating in a state that will result in impacting before entering the time-based impact detection technique.

In some embodiments, as described above, the power tool 100 selectively implements the acceleration-based technique and the time-based technique, for example, dependent on a speed of the motor. However, in some embodiments, the power tool 100 implements the acceleration-based technique, and not the time-based technique. In such embodiments, when step 730 of FIG. 7 is implemented with the method 800 of FIG. 8, the motor control unit 130 bypasses the decision block 820 and simply proceeds to the acceleration-based technique (step 840) after step 810. In other embodiments, the power tool 100 implements the time-based technique, and not the acceleration-based technique. In such embodiments, when step 730 of FIG. 7 is implemented with the method 800, the motor control unit 130 bypasses the decision block 820 and simply proceeds to the time-based technique (step 830) after step 810. In further embodiments, the motor control 100 is operable to use both the acceleration-based technique and the time-based technique, but the selection of one of the two techniques (e.g., decision block 820 of FIG. 8) occurs once per trigger pull. Accordingly, after the first impact detection, the decision block 820 is bypassed and the impact detection technique used to detect the first impact is continued to be used (e.g., until trigger release or the number of impacts reaching the desired number of impacts (step 750).

Thus, the invention provides, among other things, a power tool including a motor control unit that controls a motor based on the number of impacts delivered by the anvil by switching between two impacting detection algorithms based on motor speed.

What is claimed is:

1. A power tool comprising:
a housing;
an anvil supported by the housing;
a motor positioned within the housing configured to drive the anvil;
a hammer mechanically coupled to the motor, the hammer configured to deliver impacts to the anvil; and
a processor configured to:
determine a motor characteristic indicative of a parameter of the motor,
when the motor characteristic indicates that the parameter of the motor is below a threshold,
employ an acceleration-based technique to detect a first impact based on a change in motor acceleration, and
generate a first impact indication in response to detecting the first impact,
and
when the motor characteristic indicates that the parameter exceeds the threshold,
employ a time-based technique to detect a second impact based on an elapsed time, and
generate a second impact indication in response to detecting the second impact.

2. The power tool of claim 1, wherein the processor is further configured to:
count the impacts delivered to the anvil using the acceleration-based technique and the time-based technique to determine an impact count, and
control the motor based on the impact count.

3. The power tool of claim 2, wherein the processor is further configured to:
receive an impact count threshold indicating a desired number of impacts,
determine whether the impact count exceeds the impact count threshold, and
when the impact count exceeds the impact count threshold, perform one selected from the group consisting of stopping the motor, increasing a speed of the motor, decreasing the speed of the motor, and changing a direction of the motor.

4. The power tool of claim 1, wherein, to detect the first impact according to the acceleration-based technique, the processor is configured to:
determine an acceleration of the motor, and
determine whether a change in the acceleration of the motor exceeds an acceleration threshold,
wherein the first impact indication is generated when the change in the acceleration of the motor exceeds the acceleration threshold.

5. The power tool of claim 4, further comprising:
a sensor within the housing to detect a rotational position of the motor,
wherein the processor is further configured to determine the acceleration of the motor and the speed of the motor based on an output from the sensor.

6. The power tool of claim 1, wherein the parameter of the motor is a speed of the motor.

7. The power tool of claim 1, wherein the parameter of the motor is a current of the motor.

8. A power tool comprising:
a housing;
an anvil supported by the housing;
a motor positioned within the housing configured to drive the anvil;
a hammer mechanically coupled to the motor, the hammer configured to deliver impacts to the anvil; and
a processor configured to:
determine a motor characteristic indicative of a parameter of the motor,
set an acceleration threshold based on the motor characteristic,
detect an impact based on a change in motor acceleration exceeding the acceleration threshold, and
generate an impact indication in response to detecting the impact.

9. The power tool of claim 8, wherein the processor is further configured to:
determine that the motor characteristic indicates that the parameter of the motor exceeds a threshold, and
employ a time-based technique to detect a second impact when the parameter of the motor exceeds the threshold.

10. The power tool of claim 9, wherein, to employ the time-based technique to detect the second impact, the processor is further configured to:
set an impact time period based on a speed of the motor,
start a timer, and
determine, based on the timer, that the impact time period elapsed.

11. The power tool of claim 8, wherein the processor is further configured to:
determine that the motor characteristic indicates that the parameter of the motor exceeds a threshold;
determine that a current of the motor exceeds a current threshold; and
employ a time-based technique to detect a second impact when the speed of the motor exceeds the speed threshold and the current of the motor exceeds the current threshold.

12. The power tool of claim 8, wherein the processor is further configured to:
count a number of impacts delivered to the anvil to determine an impact count; and
control the motor based on the impact count.

13. The power tool of claim 8, wherein the processor is further configured to:
receive an impact count threshold indicating a desired number of impacts;
determine whether the impact count exceeds the impact count threshold; and
perform, when the impact count exceeds the impact count threshold and with the processor, one selected from the group consisting of stopping the motor, increasing a speed of the motor, decreasing the speed of the motor, and changing a direction of the motor.

14. The power tool of claim 13, wherein the desired number of impacts is received via a user interface of the power tool, via a communication interface of the power tool from a user interface of an application being executed on an external device, or via preprogramming of the power tool.

15. The power tool of claim 8, wherein the parameter is a speed of the motor.

16. The power tool of claim 8, wherein the change in motor acceleration is determined based on a difference between two motor velocity measurements over an elapsed time period.

17. A power tool comprising:
a housing;
an anvil supported by the housing;
a hammer configured to deliver impacts to the anvil;

a motor positioned within the housing and mechanically coupled to the hammer, the motor configured to drive the hammer to deliver the impacts to the anvil; and a processor configured to:

determine a motor characteristic indicative of a parameter of the motor, employ a first technique to detect a first impact based on the parameter of the motor, generate a first impact indication in response to detecting the first impact, employ a second technique different than the first technique to detect a second impact when the parameter of the motor exceeds a threshold, generate a second impact indication in response to detecting the second impact.

18. The power tool of claim 17, wherein the processor is further configured to:

set an impact period based on the parameter of the motor;

set a timer; and detect the second impact when the impact period has elapsed based on the timer.

19. The power tool of claim 17, wherein the parameter is a speed of the motor.

20. The power tool of claim 17, wherein the processor is further configured to:

receive a desired number of impacts to be delivered, wherein the desired number of impacts is received via a user interface of the power tool, via a communication interface of the power tool from a user interface of an application being executed on an external device, or via preprogramming of the power tool; and perform, when a number of detected impacts is greater than the desired number of impacts, one selected from the group consisting of stopping the motor, increasing a speed of the motor, decreasing the speed of the motor, and changing a direction of the motor.

* * * * *